United States Patent [19]

Wertheimer et al.

[11] 4,146,943
[45] Apr. 3, 1979

[54] GROOVED GRILL CLEANER

[76] Inventors: Donald J. Wertheimer, 8645 SE. 36th Ave., Portland, Oreg. 97202; Ralph A. Holmes, 11505 NE. Glisan St., Portland, Oreg. 97220

[21] Appl. No.: 885,478

[22] Filed: Mar. 13, 1978

[51] Int. Cl.$^2$ .............. A47J 49/00; A47L 13/06; A47L 13/34
[52] U.S. Cl. .................. 15/111; 15/236 B; 30/172
[58] Field of Search ............ 15/104.03, 104.04, 105.5, 15/111, 235.3, 236 R, 236 B; 29/81 G, 81 J; 30/172, 307; 17/29, 30, 60

[56] References Cited

U.S. PATENT DOCUMENTS

| D. 234,183 | 1/1975 | Malnar | D7/181 X |
|---|---|---|---|
| 352,082 | 11/1886 | Cross | 30/307 X |
| 606,154 | 6/1898 | Mueller | 15/93 R |
| 3,094,731 | 6/1963 | Owen | 15/236 B |
| 3,800,354 | 4/1974 | Stephens | 15/236 R |
| 3,994,040 | 11/1976 | DiStefano | 15/236 R |

FOREIGN PATENT DOCUMENTS 568474 4/1945 United Kingdom ............ 30/307

Primary Examiner—Daniel Blum
Attorney, Agent, or Firm—Lee R. Schermerhorn

[57] ABSTRACT

An elongated handle has mounted on one end thereof a plurality of spring fingers in side by side relation with toothed rotable cutter disc on free ends of the fingers. The free ends of the fingers are movable toward and away from each other to adjust themselves to the spacing of the grooves in the grill to be cleaned and are movable in a perpendicular direction to adjust themselves to the thickness of deposits in the grooves. The handle also carries a brush to sweep out debris loosened by the cutter discs.

8 Claims, 7 Drawing Figures

GROOVED GRILL CLEANER

BACKGROUND OF THE INVENTION

This invention relates to a tool for cleaning grooved grills used for cooking meat and fish products.

Grooved plate type grills are used extensively by restaurants to impart the characteristic grid appearance of products which are cooked on open grills having spaced bars to support the products. This presents a new cleaning problem in the restaurant because grease and other substances are released by the product during cooking, to seep into and accumulate as a deposit in the grooves of the grill. This deposit combines with fresh grease, hardens and forms a dark, sometimes sticky, residue.

Cleaning of the grooves is complicated by the fact that different amounts of accumulated deposits exist from groove to groove and furthermore the amount of deposits in each groove vary along the length of the groove, producing a rough, erratic surface on the hardened deposits. The tools and techniques used for cleaning flat grills are not effective on grooved grills.

Objects of the invention are therefore to provide a tool for cleaning a grooved grill, to provide a tool having highly effective cutters for removing hardened deposits from the grooves of a grooved grill, to provide a tool having a plurality of cutters which adjust themselves individually to the spacing of the grooves in a grill and to varying thickness of deposits in the grooves, and to provide a tool of the type described in which such cutters are mounted on spring fingers to float both horizontally and vertically in accomplishing the described adjustments.

SUMMARY OF THE INVENTION

In the present construction an elongated handle has mounted on one end thereof a plurality of spring fingers in side by side relation with toothed rotable cutter discs on free ends of the fingers. The free ends of the fingers are movable toward and away from each other to adjust themsleves to the spacing of the grooves in the grill to be cleaned and are movable in a perpendicular direction to adjust themselves to the thickness of deposits in the grooves. The handle also carries a brush to sweep out debris loosened by the cutter discs.

The invention will be better understood and additional objects and advantages will become apparent from the following description of the preferred embodiment illustrated on the accompanying drawing. Various changes may be made in the details of construction and arrangement of parts and certain features may be used without others. All such modifications within the scope of the appended claims are included in the invention.

BRIEF DESCRIPTION OF THE PREFERRED EMBODIMENT

Figure 3:
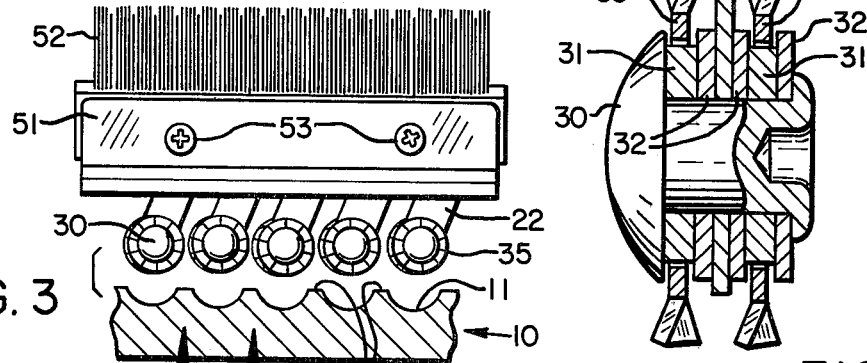
FIG. 3 is an end elevation view with a portion of a grooved grill shown in section.

Referring first to FIG. 3, the numeral 10 designates a cross-section view of a typical grooved grill for cooking meat and fish products. Heat applied to the underside of grill 10 is transmitted to portions of the product by conduction through flat surfaces 12 on which the product rests and by radiation from the surfaces of grooves 11 to intervening areas of the product. As the product cooks, grease and other substances from the product seep into grooves 11 and build up hardened deposits in the grooves which detract from the cleanliness of the grill and impair the cooking operation.

Figure 1:
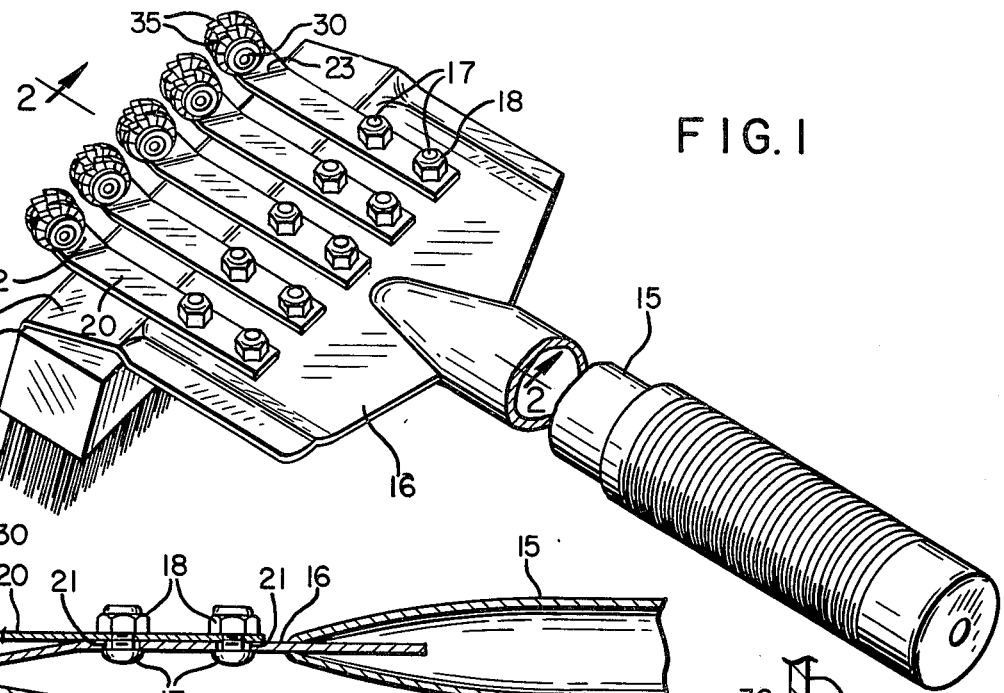
FIG. 1 is a perspective view of a grooved grill cleaner embodying the invention.
Figure 2:
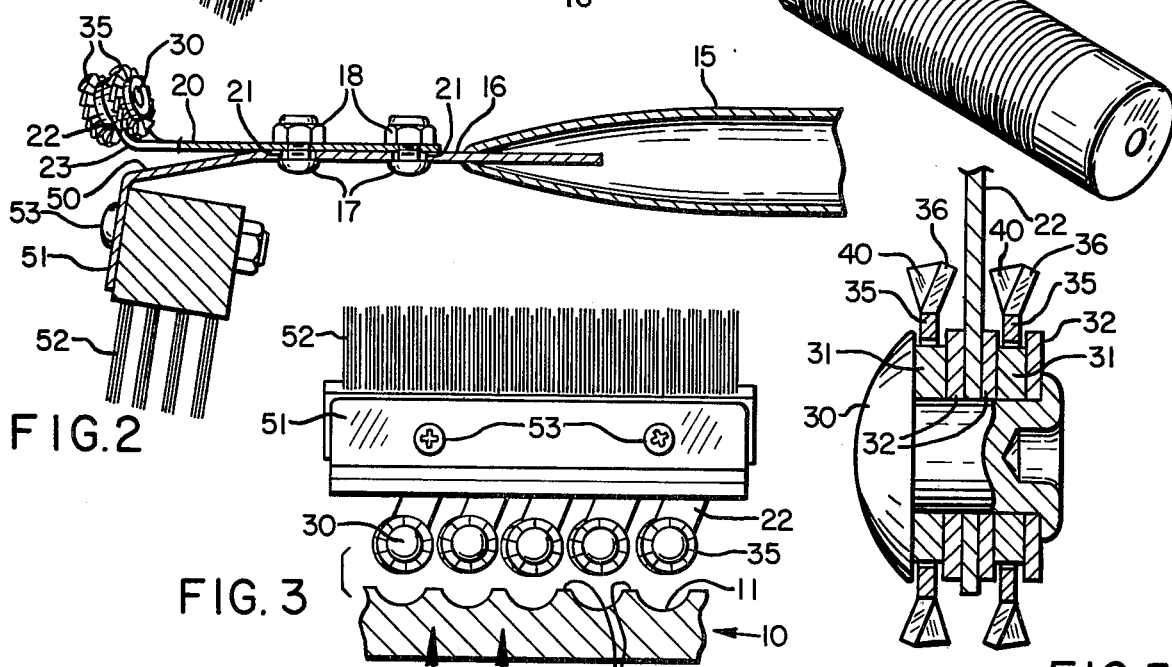
FIG. 2 is a view on the line 2—2 in FIG. 1.

The present tool for cleaning grooves 11 comprises an elongated handle 15 having a flat plate 16 on its distal end as shown in FIG. 1. Bolts 17 and nuts 18 secure a plurality of flat spring metal fingers 20 to the plate 16 with the fingers disposed side by side in a common plane As shown in FIG. 2 the bolts 17 extend through holes 21 in the plate 16 which are larger than the bolt shanks whereby the free ends of fingers 20 may pivot laterally toward and away from each other in the common plane. Bolts 17 thus form pivot pins for the fingers. The bolts are not tightened on plate 16 and fingers 20.

Each finger has a free end 22 which is bent at an angle almost perpendicular to the plane of the fingers. The line of the bend at 23 makes an angle of about 55° with one side edge of the finger as indicated at 25 in FIG. 4.

Figure 5:
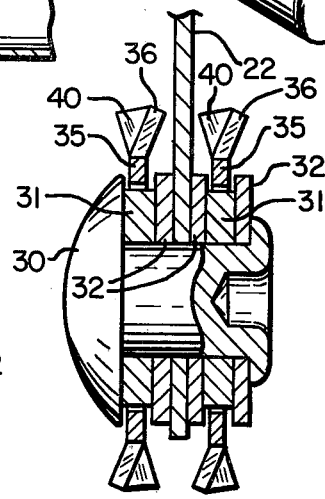
FIG. 5 is a view on the line 5—5 in FIG. 4.

As shown in FIG. 5 a rivet 30 is secured in the bent free end 22 of each finger 20. Clamped between the ends of the rivet are the finger end 22, two spacing collars 31 and three washers 32. A pair of cutter discs 35 is mounted for rotation on collars 31 on opposite sides of finger end 22, the cutter discs being of less thickness than the collars. Rivets 30 form pivot pins for cutter discs 35. Thus the pivot pins 30 are angled at about 35° to the direction of fingers 20.

Cutter discs 35 are formed from washers having radial cuts 36 which form peripheral teeth 40. In making the radial cuts 36 substantially no material is removed from the washer. Each tooth is then twisted to about a 25° angle with respect to the plane of the washer. The ends of the twisted teeth present a substantially continuous circumference on the washer without significant circumferential gaps between the teeth.

Figure 4:
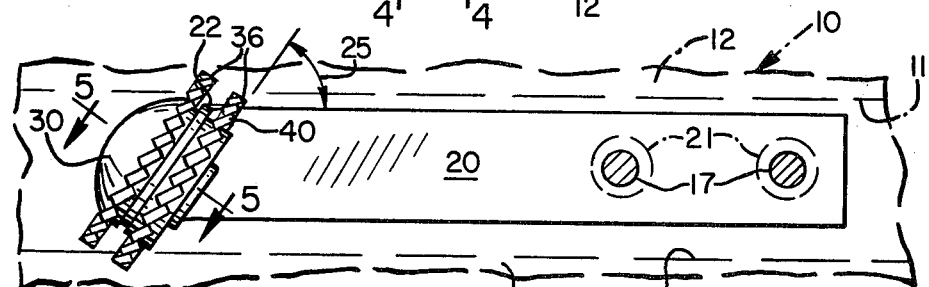
FIG. 4 is a view on the line 4—4 in FIG. 3 with a portion of the grill shown in phantom lines.

As best shown in FIG. 4, the teeth 40 are twisted so that on the under sides of the cutter discs which engage the grill 10 the direction of twist of the teeth is the same as the direction of twist of finger ends 22 at angle 25. This places the teeth 40 at about a 30° angle to the grooves 11 when handle 15 is held parallel with the grooves, causing the cutter discs to rotate and remove hardened deposits cleanly without merely cutting grooves in the deposits. The five surfaces on each tooth 40 meet in sharp, square corners effective for scraping.

The values of angles specified above are not critical and may be varied to a considerable extent. It must of course be realized that the operator will not necessarily hold the handle precisely parallel with the grooves in the grill and that a left handed operator will probably hold the handle at a different angle than a right handed operator. Rotation of cutter discs 35 is not essential to the cleaning action.

Cutter discs 35 are of a size to fit grooves 11 of average width when presented to the grooves at angle 25. The cutter discs will enter narrower grooves by shifting the handle clockwise in FIG. 4 and will fit wider grooves by shifting the handle counter clockwise. The angle 25 of bend 23 makes this adaptability possible.

As shown in FIG. 2 the outer end portion 50 of plate 16 is bent at a small angle away from the plane of fingers 20 so as to present a divergent relationship. Angular plate portion 50 thereby provides a stop to prevent fingers 20 from being bent beyond their elastic limits if the cutters 35 are pressed into the grooves 11 of the grill with excessive force when the tool is turned over and applied to the grill 10 as shown in FIG. 3.

The extremity 51 of plate end portion 50 is bent at right angles for mounting a wire brush 52 by means of bolts 53. As viewed in FIG. 2 the outermost row of bristles on the distal side of brush 52 are in approximate vertical alignment with the outermost cutters 35 so that in grills where the back ends of the grooves terminate at a vertical wall surface both the cutters and the bristles may be applied to the grooves substantially at such wall surface to clean the entire length of the grooves. All material loosened but not removed by the cutters is readily swept out of the grooves by the brush.

Figure 6:
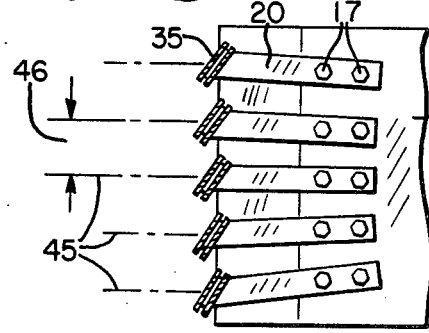
FIGS. 6 and 7 shown variations in spacing of the cutter disc fingers to adjust themselves to the spacing of the grooves in the grill.
Figure 7:
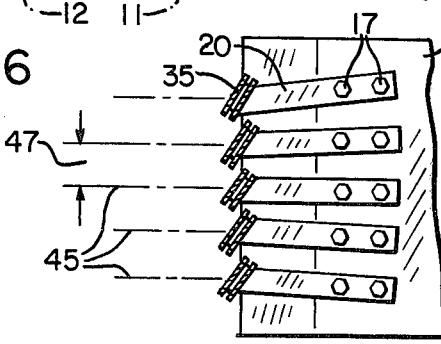

FIGS. 6 and 7 illustrate the lateral floating movements of fingers 20 to adjust to the spacing of grooves 11 in different grills. Lines 45 represent the center lines of the grooves on the grill. In FIG. 6 the fingers 20 are spread apart in divergent relation so that the cutters 35 will fit in grooves having a spacing represented by the dimension 46 while in FIG. 7 the fingers are crowded together in convergent relation so that cutters 35 will fit the grooves in a grill having a closer spacing according to the smaller dimension 47 and will accommodate irregularities in the grooving process when the grill is made.

What is claimed is:

1. A grooved grill cleaner comprising an elongated handle, a plurality of spring fingers extending in side by side relation in a common plane from the distal end of said handle, and cutters mounted on free ends of said fingers for movement along the grooves in said grill to clean the grooves, the free ends of said fingers being movable relative to each other in said common plane to adjust themselves to the spacing or irregularities of said grooves and movable perpendicular to said common plane relative to each other to adjust themselves to the thickness of deposits in the grooves, said cutters being disposed transversely of said fingers for said movement along said grooves, said cutters comprising cutter discs rotatably mounted on said fingers, each of said cutter discs comprising a washer having teeth formed by peripheral radial cuts in the washer, said teeth being twisted out of the plane of the washer with the ends of the teeth presenting a substantially continuous circumference on the washer without circumferential gaps between the teeth.

2. A grill cleaner as defined in claim 1, there being a pair of said cutter discs axially apart from each other on each of said fingers.

3. A grill cleaner as defined in claim 1, each finger having a cutter disc pivot pin angled in one direction away from the direction of the finger, said teeth being twisted further in the same direction as said pivot pin to cause the cutter disc to rotate when said fingers are pulled lengthwise in said grooves of the grill.

4. A grooved grill cleaner comprising an elongated handle, a plurality of spring fingers extending in side by side relation in a common plane from the distal end of said handle, and cutters mounted on free ends of said fingers for movement along the grooves in said grill to clean the grooves, the free ends of said fingers being movable relative to each other in said common plane to adjust themselves to the spacing or irregularities of said grooves and movable perpendicular to said common plane relative to each other to adjust themselves to the thickness of deposits in the grooves, said cutters being disposed transversely of said fingers for said movement along said grooves, a flat plate on said distal end of the handle, said fingers comprising flat strips of spring material pivotally mounted on said plate for said movements in said common plane, and said free ends of said fingers supporting said cutters being bent substantially perpendicular to said common plane.

5. A grill cleaner as defined in claim 4, said pivotal mounting of said fingers on said plate comprising a pair of pins in each finger extending through holes in said plate which are larger than the pins to allow limited pivotal movement of the fingers on said plate.

6. A grill cleaner as defined in claim 4 including a pivot pin in said bent free end of each finger, said cutters comprising a pair of cutter discs rotatably mounted on said pin on opposite sides of said finger.

7. A grill cleaner as defined in claim 4, said plate extending along said fingers in divergent relation thereto to limit the bending of the fingers when they are pressed into said grooves.

8. A grill cleaner as defined in claim 4 including a brush mounted on said plate to sweep out debris loosened by said cutters.

* * * * *